US006621794B1

United States Patent
Heikkinen et al.

(10) Patent No.: US 6,621,794 B1
(45) Date of Patent: Sep. 16, 2003

(54) METHOD AND APPARATUS FOR MEASURING THE TIMING DIFFERENCE BETWEEN PHYSICAL IMA LINKS AND FOR DELIVERING A TIME DIFFERENCE TO THE IMA LAYER

(75) Inventors: Pekka Heikkinen, Helsinki (FI); Janne Tuomisto, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/252,264

(22) Filed: Feb. 18, 1999

(51) Int. Cl.$^7$ .............................. G08C 15/00; H04J 1/16
(52) U.S. Cl. ..................................... 370/235; 370/236.2
(58) Field of Search ................................. 370/235, 236, 370/395.1, 395.3, 395.41, 395.62, 395.71, 394, 535, 412, 236.2; 375/356, 372

(56) References Cited

U.S. PATENT DOCUMENTS

| | | | | |
|---|---|---|---|---|
| 5,917,870 A | * | 6/1999 | Wolf ........................... | 375/356 |
| 5,936,618 A | * | 8/1999 | Spiero et al. ................ | 345/204 |
| 6,084,889 A | * | 7/2000 | Murakami ................... | 370/474 |
| 6,167,061 A | * | 12/2000 | Nakatsugawa .............. | 370/480 |
| 6,205,142 B1 | * | 3/2001 | Vallee ......................... | 370/394 |
| 6,222,858 B1 | * | 4/2001 | Counterman ................ | 370/474 |

FOREIGN PATENT DOCUMENTS

| | | |
|---|---|---|
| EP | 0 818 941 | 1/1998 |
| WO | WO 96/08120 | 3/1996 |
| WO | WO 96/17489 | 6/1996 |
| WO | WO 98/08355 | 2/1998 |

OTHER PUBLICATIONS

"Inverse Multiplexing for ATM (IMA) Specification, Version 1.0", *The ATM Forum Technical Committee*, AF–PHY–0086.000, pp. 1–135 (Jul. 1997).

Aguilar–Igartua, M. et al. *Inverse Multiplexing for ATM. Operation, Applications and Performance Evaluation for the Cell Loss Ratio*, Department of Applied Mathematics and Telematics. Polytechnic University of Catalonia (UPC), $2^{nd}$ International Conference on ATM 1999, IEEE, pp. 472–481.

* cited by examiner

*Primary Examiner*—Seema S. Rao
*Assistant Examiner*—Ronald Abelson
(74) *Attorney, Agent, or Firm*—Squire, Sanders & Dempsey LLP

(57) ABSTRACT

A method and apparatus for measuring the timing difference between physical IMA links and for delivering time difference to the IMA layer. The invention includes obtaining a first data value for use as a reference, obtaining a second data value, processing the first and second data values to obtain an indication of frequency difference and determining a number of stuffing cells to be added to an ATM link based upon the indication of frequency difference.

18 Claims, 11 Drawing Sheets

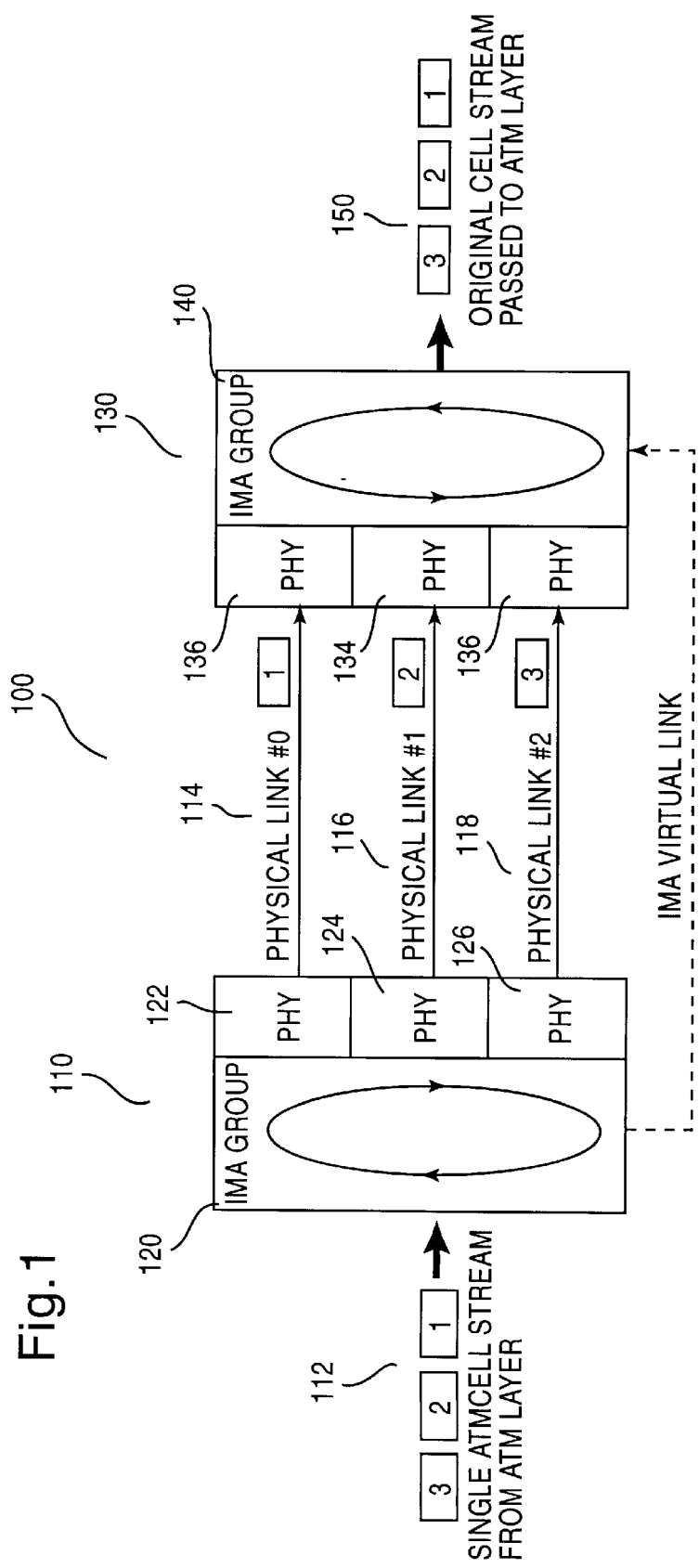

Fig. 2

| | | USER PLANE FUNCTIONS | LAYER MANAGEMENT FUNCTIONS | PLANE MANAGEMENT FUNCTIONS |
|---|---|---|---|---|
| ATM LAYER | | | | |
| PHYSICAL LAYER | IMA TRANSMISSION CONVERGENCE SUBLAYER | • ATM CELL STREAM SPLITTING AND RECONSTRUCTION<br>• ICP CELLS INSERTION/REMOVAL<br>• CELL RATE DECOUPLING<br>• IMA FRAME SYNCHRONIZATION<br>• STUFFING<br>• DISCARDING OF CELLS WITH BAD HEC | • IMA CONNECTIVITY<br>• ICP CELL ERRORS (OIF,LIF)<br>• LIF/LODS/RDI-IMA DEFECT PROCESSING<br>• RDI-IMA ALARM GENERATION<br>• Tx/Rx IMA LINK STATE REPORT | • IMA GROUP CONFIGURATION<br>• LINK ADDITION/DELETION<br>• ATM CELL RATE CHANGE<br>• IMA GROUP FAILURE NOTIFICATION<br>• IMA STATISTICS |
| | INTERFACE SPECIFIC TRANSMISSION CONVERGENCE SUBLAYER | • CELL SCRAMBLING/DESCRAMBLING (IF REQUIRED)<br>• NO CELL DISCARDING<br>• CELL DELINEATION<br>• HEADER ERROR CORRECTION (IF REQUIRED)<br>• HEC GENERATION/VERIFICATION | • HEC ERROR INDICATION<br>• LCD-RDI ALARM GENERATION (IF REQUIRED) | • LCD FAILURE NOTIFICATION<br>• TC STATS |
| | PHYSICAL MEDIUM DEPENDENT SUBLAYER | • BIT TIMING<br>• LINE CODING<br>• PHYSICAL MEDIUM | • LOCAL ALARM PROCESSING<br>• RDI ALARMS GENERATION | • LINK FAILURE NOTIFICATION<br>• PMD STATS |

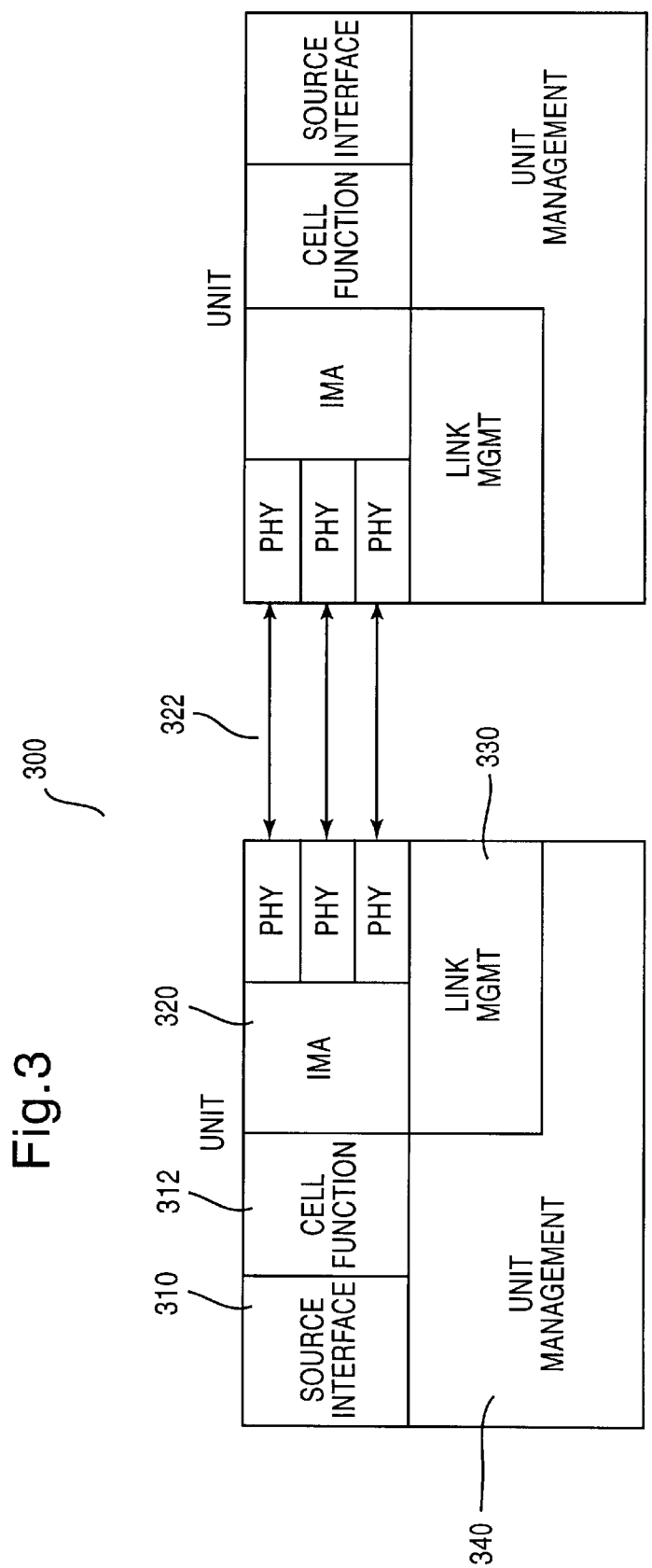

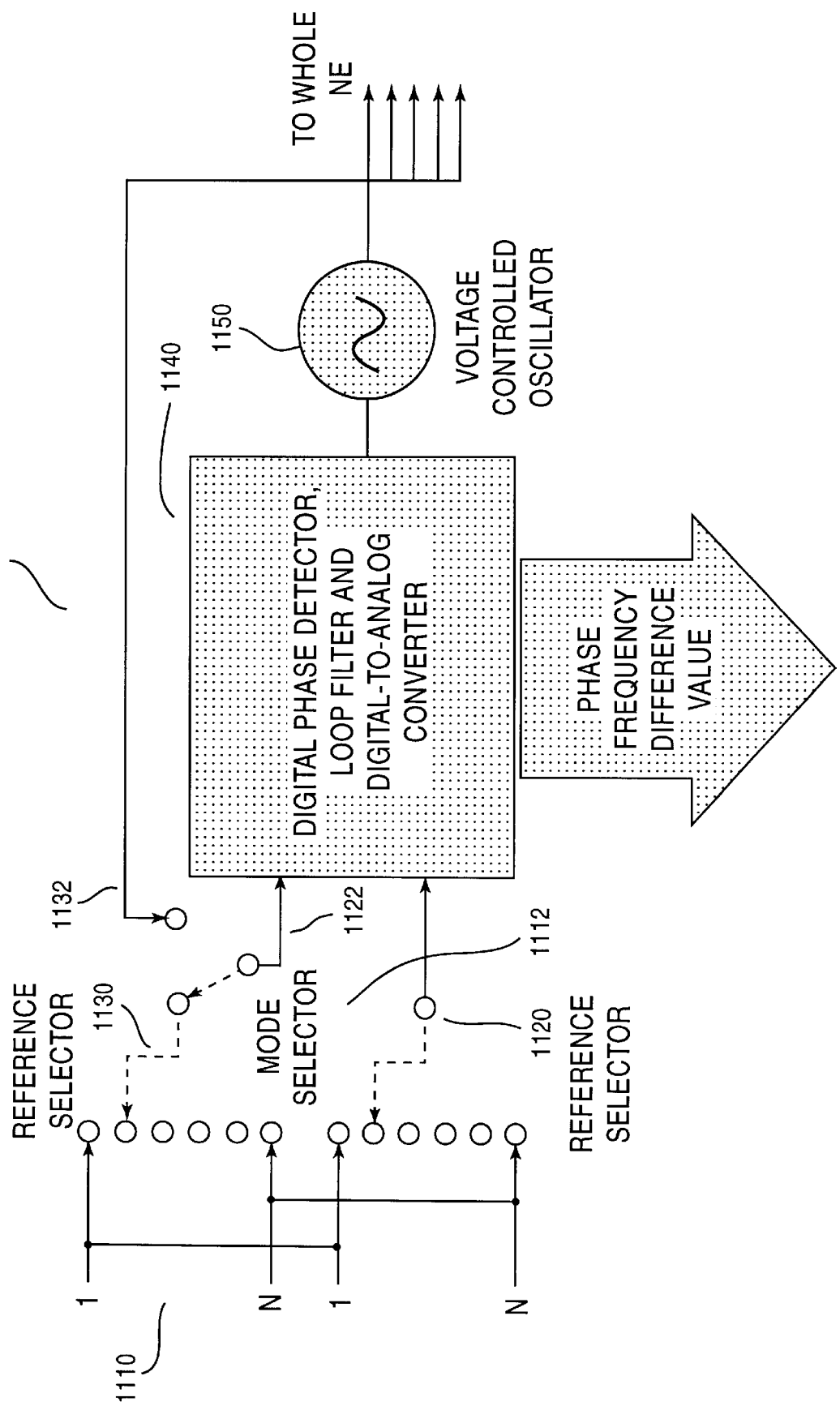

METHOD AND APPARATUS FOR MEASURING THE TIMING DIFFERENCE BETWEEN PHYSICAL IMA LINKS AND FOR DELIVERING A TIME DIFFERENCE TO THE IMA LAYER

BACKGROUND OF THE INVENTION

1. Field of the Invention

This invention relates in general to a digital data communication networking, and more particularly to a method and apparatus for measuring the timing difference between physical Inverse Multiplexing for ATM (IMA) links and for delivering a time difference to the IMA layer.

2. Description of Related Art

The demand for large amounts of bandwidth over extended distances is driving interest in networking technologies such as ISDN (Integrated Services Digital Networks), frame relay, SMDS (Switched Multimegabit Digital Service), ATM (Asynchronous Transfer Mode), satellite data communications systems, wireless communications systems, and others. However, to make most of these services universally available requires either a new communications network infrastructure, or significant modifications to the existing one. For example, ATM promises high bandwidth digital connections based upon fixed-size data cells that can carry voice, video and data. But universal ATM also requires that today's public switched telephone network replace its time-division multiplexed switching fabric with a new ATM switching fabric and enhanced inter-office trunk facilities. Considering that the value of the existing worldwide telephony infrastructure (switches, transmission systems and embedded wiring plant) is estimated to be in the trillions of dollars, it's unlikely that this infrastructure will be replaced by ATM anytime soon.

While alternative transmission technologies will certainly be implemented over time to handle the growing demand for high-speed digital bandwidth, the existing digital Time-Division Multiplexing (TDM) infrastructure must be fully utilized also. Further, until recently, many end users who wanted to implement ATM WANs were stuck choosing between the high cost of T3 (45 Mbps) or E3 (34 Mbps), and the affordable but inadequate bandwidth of an individual T1 (1.544 Mbps) or E1 (2.048 Mbps).

Two significant enhancements to TDM networking have made possible the full utilization of existing TDM infrastructure while maximizing the utility of the existing worldwide telephony infrastructure. The first is recently-developed software for digital TDM switches that allows dialed connections to exceed the original design channel rate of 56 or 64 kbits, allowing carriers to offer dialed wideband services. The second is the use of specialized equipment which resides at the user's premises to allow multiple independent digital connections to be "combined" to create a single, higher-speed end-to-end connection. This technique is known as "inverse multiplexing", and the equipment that performs it is called an inverse multiplexer.

When first introduced, ATM access concentrators were simple multiplexers that aggregated traffic to an ATM uplink. This in itself is a pretty good trick, involving converting traffic to the appropriate ATM Adaptation Layer and assigning priorities to various traffic streams. However, access concentrators now offer a lot more. They feature local switching engines to move traffic between local ports on the box, with more sophisticated traffic management facilities than the previous generation offered.

As mentioned above, a historic problem with large-scale traffic aggregation is the fact that a T1 pipe is often too small to take all of your traffic, but T3 is too large- and too expensive. The latest round of ATM products for the WAN features IMA, which is the UNI (User-to-Network Interface) standard that was ratified by the ATM Forum. IMA can be used over T1 circuits to bridge the broad price and performance gap between T1 and T3 services. With it, trunk capacity can be easily added by simply installing more T1 circuits, up to a maximum of eight or so, beyond which T3 service makes sense.

IMA moves ATM cells across trunks in a cyclic round-robin fashion, so each link is equally loaded. Thus, IMA circuits can provide a measure of fault tolerance, especially when trunks are diversely routed. Diverse routing helps with fault tolerance but can introduce problems of its own. The enemy of IMA is differential delay, a problem that can occur when T1 trunks aren't routed the same way. IMA must deliver cells in order, so buffers are required to keep traffic moving smoothly. In addition, traditional digital transmission systems and hierarchies have been based on multiplexing signals which are plesiochronous (running at almost the same speed).

When multiplexing a number of 2 Mbps channels they are likely to have been created by different pieces of equipment, each generating a slightly different bit rate. Thus, before these 2 Mbps channels can be bit interleaved they must all be brought up to the same bit rate adding 'dummy' information bits, or 'justification bits'. The justification bits are recognize as such when demultiplexing occurs, and discarded, leaving the original signal. This process is know as plesiochronous operation, i.e., "almost synchronous".

The same problems with synchronization, as described above, occur at every level of the multiplexing hierarchy, so justification bits are added at each stage. The use of plesiochronous operation throughout thee hierarchy has led to adoption of the term Plesiochronous Digital Hierarchy (PDH).

Accordingly, these smaller bandwidth PDH transmission lines may have different clock sources which means different frequencies in these lines. IMA has to compensate this frequency difference by inserting stuffing cells to the lines which have faster clocks. Nevertheless, the IMA specification doesn't determine any method to be used for measuring the frequency differences between physical links.

It can be seen then that there is a need for a method and apparatus for measuring the timing difference between physical IMA links and for delivering time difference to the IMA layer.

It can also be seen that there is a need for a method and apparatus that uses the timing differences to generate stuffing cells with the proper rate on the transmit links.

SUMMARY OF THE INVENTION

To overcome the limitations in the prior art described above, and to overcome other limitations that will become apparent upon reading and understanding the present specification, the present invention discloses a method and apparatus for measuring the timing difference between physical IMA links and for delivering time difference to the IMA layer.

The present invention solves the above-described problems by measuring the timing difference between physical IMA links and delivering time difference to the IMA layer. The timing differences is then used to generate stuffing cells with the proper rate on the transmit links. The implementation of the physical interfaces with IMA can be a separate IMA chip and separate physical layer framers. When the IMA chip and framers are attach to each other via a UTOPIA bus which doesn't carry the line timing, the IMA chip must receive the frequency difference by some other means.

A method in accordance with the principles of the present invention includes obtaining a first data value for use as a reference, obtaining a second data value, processing the first and second data values to obtain an indication of frequency difference and determining a number of stuffing cells to be added to an ATM link based upon the indication of frequency difference.

Other embodiments of a system in accordance with the principles of the invention may include alternative or optional additional aspects. One such aspect of the present invention is that the first data value includes a reference clock signal and the second data value is a clock obtained from a first ATM link.

Another aspect of the present invention is that the processing further includes examining the reference clock signal and the clock from the first ATM link to obtain the indication of frequency difference.

Another aspect of the present invention is that the processing further includes measuring a phase difference between the reference clock and the clock from the first ATM link and calculating the indication of frequency difference in response thereto.

Another aspect of the present invention is that the calculating further includes computing a time interval for measuring the phase difference and determining the indication of frequency difference according to:

$$\Delta f = \frac{\Delta \Phi}{2\pi * \Delta t},$$

where $\Delta f$ is the frequency difference between the reference clock and the clock of the first ATM link, $\Delta \Phi$ is the phase difference and $\Delta t$ is the time interval.

Another aspect of the present invention is that the first data value is a counter value of a first buffer containing cells from a first ATM link and the second data value is a counter value of a second buffer containing cells from a second ATM link.

Another aspect of the present invention is that the processing further includes examining the counter value of the first and second counters to obtain the indication of frequency difference.

Another aspect of the present invention is that the processing further includes measuring a cell amount difference based upon the counter value of the first and second counters calculating the indication of frequency difference in response thereto.

Another aspect of the present invention is that the calculating further includes computing a time interval for measuring the cell amount difference and determining the indication of frequency difference according to:

$$\Delta c = \frac{n_1 - n_2}{\Delta t},$$

where $\Delta c$ is the frequency difference between the cells in the buffer for the first ATM link and the cells in the buffer for the second ATM link, $n_1$ is the cell amount of the first ATM link, $n_2$ is the cell amount of the second ATM link and $\Delta t$ is the time interval.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 1 illustrates a ATM system performing IMA in a first direction;

FIG. 2 illustrates the Layer Reference Model including the IMA sublayer;

FIG. 3 illustrates a block diagram of IMA units;

FIG. 11 illustrates a timing system for an IMA network element.

DETAILED DESCRIPTION OF THE INVENTION

Figure 4:
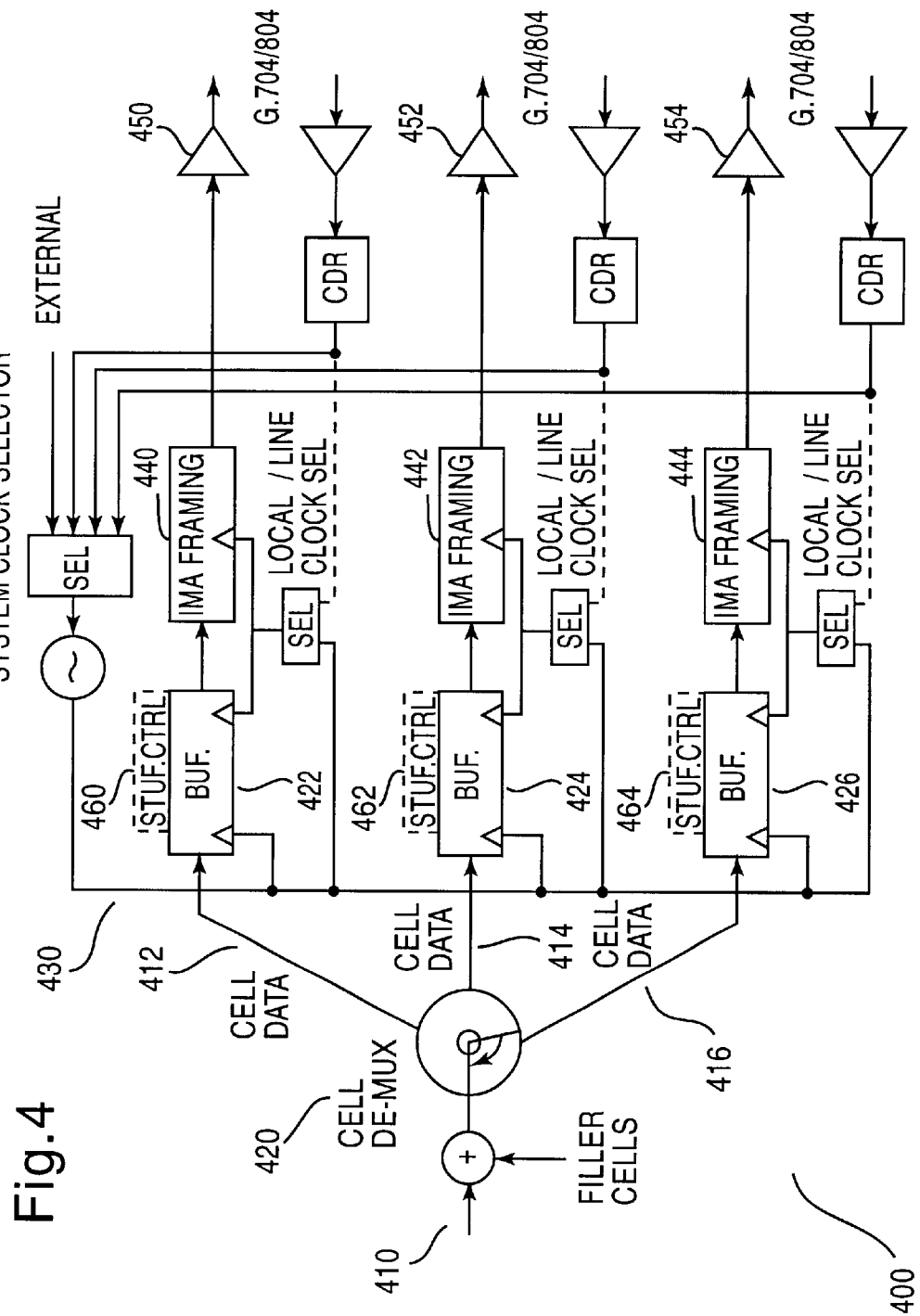
FIG. 4 illustrates the timing functions of an IMA transmitter.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for measuring the timing difference between physical IMA links and for delivering time difference to the IMA layer.

FIG. 1 illustrates a ATM system 100 performing IMA in a first direction. In FIG. 1, a first ATM network element 110 receives a single ATM cell stream 112 from a remote ATM Layer (not shown). In the transmit direction, the ATM cells are distributed across physical links 114, 116, 118 in a round robin sequence under control of the IMA group 120. The IMA group 120 multiplexes the ATM cell stream onto multiple physical links 114, 116, 118 via Physical Layers (PHY) 122, 124, 126. Each of the ATM cells are received by a receiving ATM network element 130 via PHYs 132, 134, 136. The cells from the PHYs 132, 134, 136 are demultiplexed by the receiving IMA group 140 recreating the single ATM cell stream 150.

Accordingly, ATM cells are multiplexed and demultiplexed in a cyclical fashion among links grouped to form a higher bandwidth logical link whose rate is approximately the sum of the transmission rate for all of the links. The transmit IMA periodically transmits special cells that contain information that permit reconstruction of the ATM cell stream at the receiving IMA end after accounting for the link delays, smoothing Cell Delay Variation (CDV) introduced by the control cells, etc. These cells, defined as IMA Control Protocol (ICP) cells, provide the definition of an IMA frame. The transmitter must align the transmission of IMA frames on all links.

FIG. 2 illustrates the Layer Reference Model 200 including the IMA sublayer 210. In FIG. 2, the IMA Sublayer 210 can be seen to be a part of the Physical Layer 212. The IMA Sublayer 210 is located between the traditional Transmission Convergence Sublayer 214 and the ATM Layer 216. The User Plane Functions 220, the Layer Management Functions 222 and the Plane Management Functions 224 for each of the sublayers is illustrated.

FIG. 3 illustrates a block diagram of IMA units 300. The Source Interface 310 provides the connection (typically proprietary) to an internal data bus, e.g., an ATM switch, router, or computer. The Source Interface 10 may also be a standard interface, e.g., data exchange interface (DXI) over a High-Speed Serial Interface (HSSI).

The Cell Function 312 is dependent upon the Source Interface 310. If the Source Interface 310 emits ATM cells, the Cell Function 312 is null and Operations, Administration, and Maintenance (OAM) cells, Resource Management (RM) cells, etc. must be passed transparently through the Source Interface 310. If the Source Interface 310 does not emit ATM cells, the Cell Function 312 must arrange for the output of the Source Interface 310 to be converted into ATM cells.

The IMA 320 controls the distribution of cells onto the group of links 322 made available to the IMA and handles differential delays and actions to be taken when links are added/dropped or when the links are failed/restored. In the receive direction, the IMA 320 performs differential delay compensation and recombines the cells into the original cell stream with the original inter-cell spacing. Thus, the IMA 320 emulates a single UNI/NNI/BICI physical link. The IMA 320 process of splitting and recombining streams is as transparent to the ATM layer as a traditional single-link Physical Layer Interface.

The Link Management 330 provides direct management of the physical links, e.g., establishing links. The Link Management 330 also provides notification of network management operations upon detection of link defects, collecting Facility Data Link information, instantiating the physical link management information base (MIB) objects, etc. In addition, the Link Management 330 relates to the management and establishment of the links available to the IMA function 320. The Unit Management 340 provides for the management of all functions of the entire unit. For example, capabilities required by users would include support of MIBs indicating the status of the IMA function 320, integration of alarms in the IMA 320, provision of a configuration interface, etc.

FIG. 4 illustrates the timing functions of an IMA transmitter 400. The incoming ATM stream 410 is divided to 3 IMA-links 412, 414, 416 by the cell demultiplexer 420 and written to the transmit buffers 422, 424, 426. The transmit buffers 422, 424, 426 are read according to a transmitter clock 430 which may be a common system clock or received clock individually for each link. IMA framing 440, 442, 444 is applied and the cell data is retransmitted via drivers 450, 452, 454. If loop timing is used a stuffing mechanism 460, 462, 464 is needed to avoid buffer over/under flows.

Figure 5:
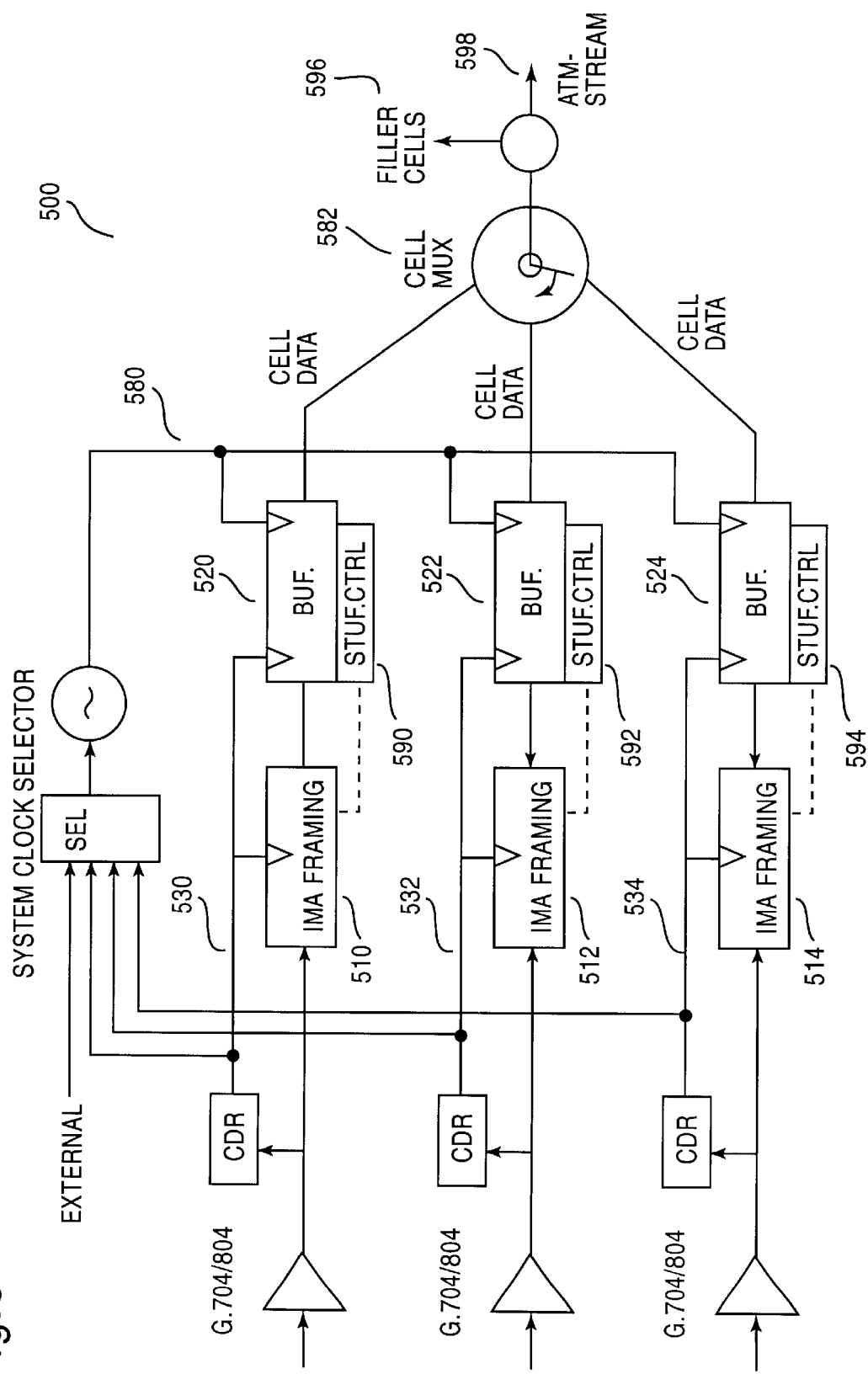
FIG. 5 illustrates the block diagram of the timing functions in a IMA receiver.

FIG. 5 illustrates the block diagram of the timing functions in a IMA receiver 500. The data is framed via IMA framing 510, 512, 514 and written to the receiver buffer 520, 522, 524 with recovered clock 530, 532, 534. The data is read with a common system clock 580 to the cell multiplexer 582. The buffer has also the dejustification control if stuffing is used 590, 592, 594. The cell multiplexer 582 recombines the cell data. Filler cells 596 are discarded and the original ATM steam 598 is transmitted.

The characteristic of the transport is to transfer all transmitted bits to the receiver and generate the exact same mean frequency that was used in the transmitter. Due to several mapping action, stuffing, pointer actions and desynchronizer actions the received signal may have short term phase variations (jitter and wander), but the mean frequency over a longer period is exactly the same that was used in the transmitter. The transparent transport network transfers every sent bit to the receiver.

For some purposes, e.g., cross-connect or timing links, the signal path may go through a frame buffer, which has a re-timing functions. This means that the data which is written to the frame buffer is read out using a different clock. The consequence is regular over/under flow situation depending on the frequency off-set. If the frequency off-set between two Primary Reference Clock (PRC) system is $10^{-11}$, a frame slip happens every 28.9 days.

Figure 6:
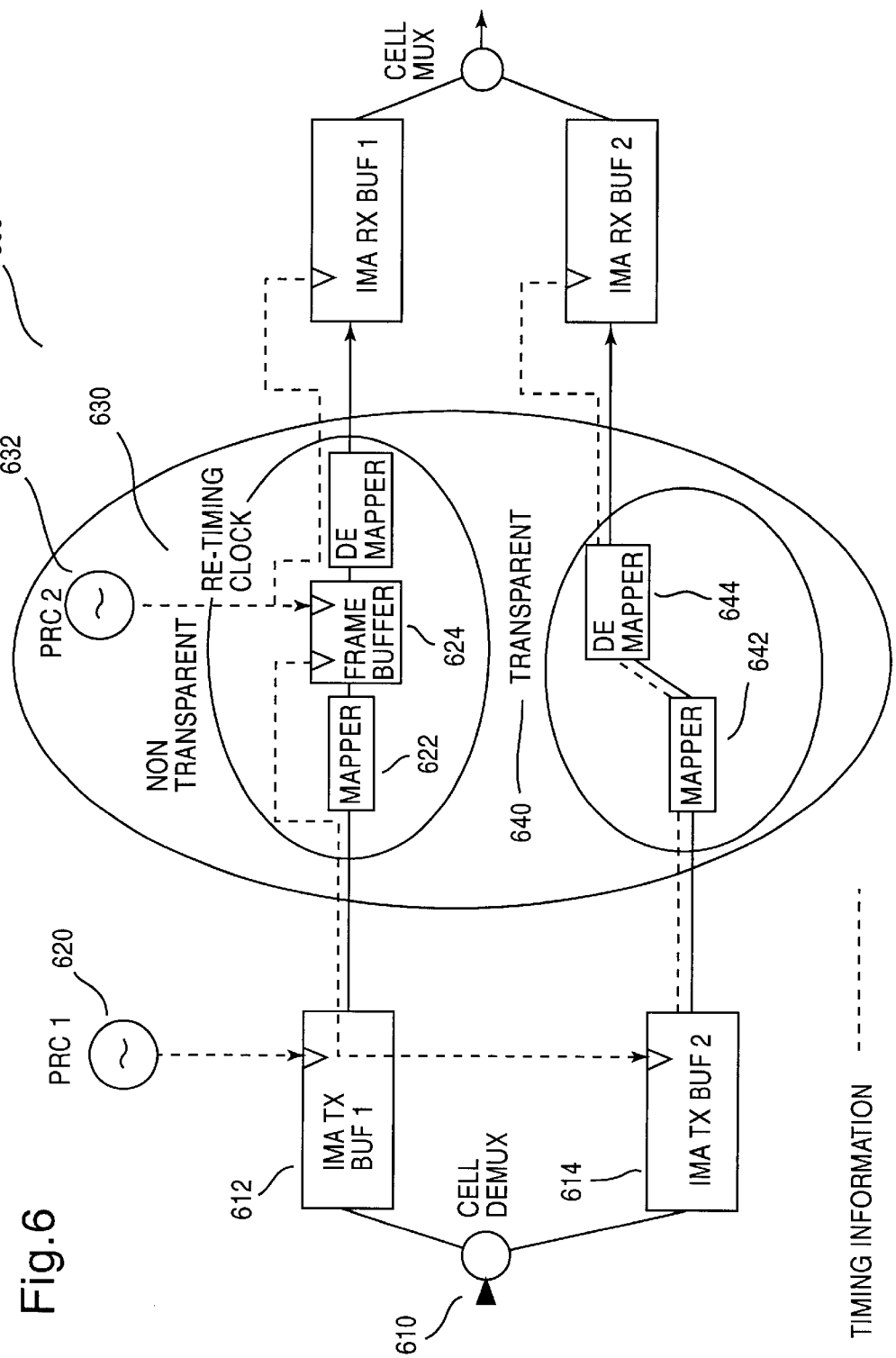
FIG. 6 illustrates timing transparency in a transport network wherein central timing is used.

There are two timing options that may be used in an IMA transmitter: central timing and loop timing. FIG. 6 illustrates timing transparency in a transport network wherein central timing 600 is used. In FIG. 6, the cell data 610 is demultiplexed and goes through IMA transmit buffers 612, 614. The IMA transmit buffers .612, 614 are clocked using PRC1 620. The data, in non-transparent mode, then goes through a mapper 622 and then to a frame buffer 624. The data which is written to the frame buffer in the non-transparent transport network 630 is read out using a different clock, PRC2 632. In the transparent transport network 640, the data is read by mapper and then by demapper 644. However, in the transparent mode 640, the central clock, PRC1 620, is used throughout the link. Thus, with central timing, one of the incoming signals is selected to be the master reference and all outgoing signals are synchronized to the central timing reference.

Figure 7:
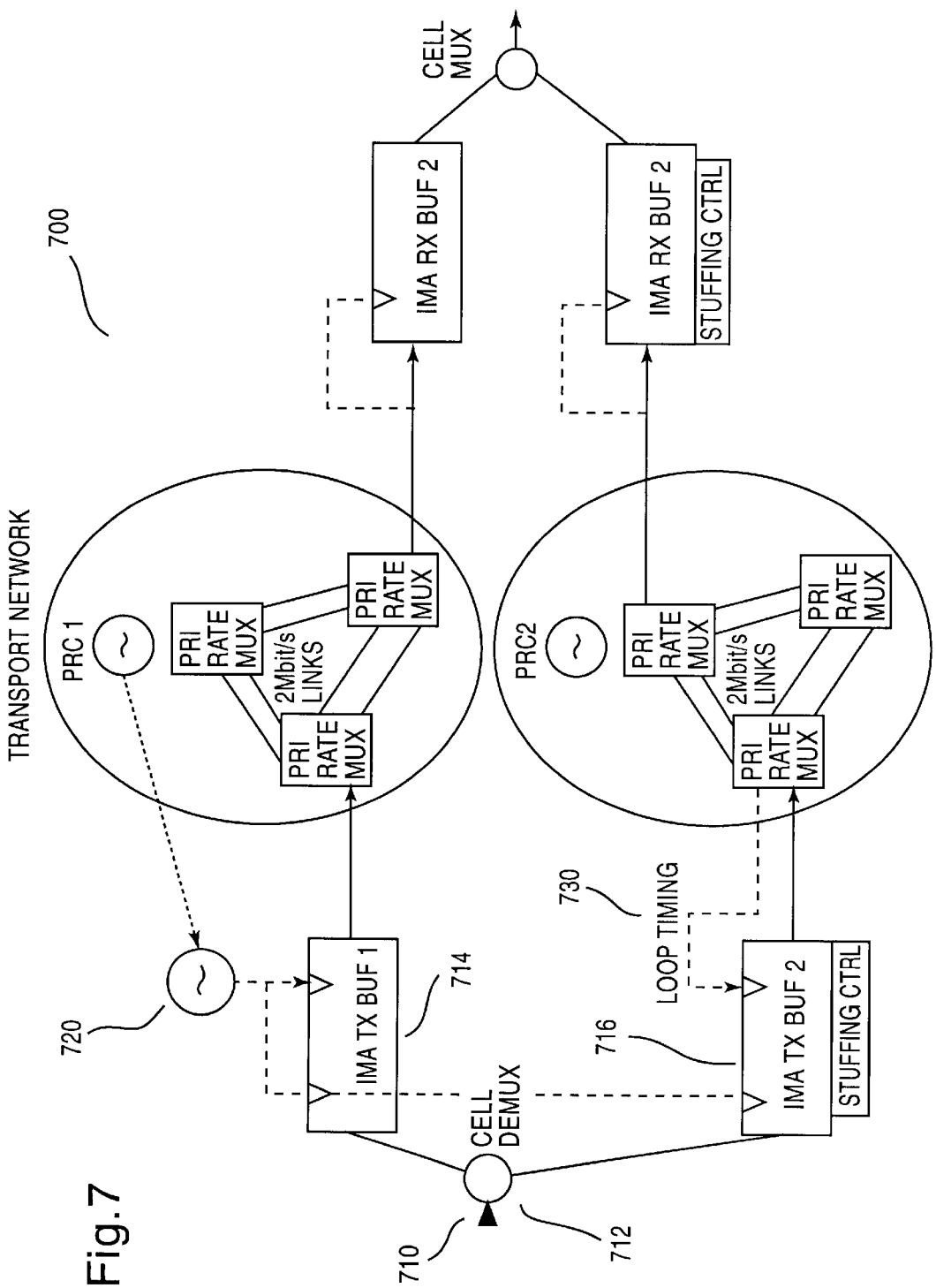
FIG. 7 illustrates loop timing.

FIG. 7 illustrates loop timing 700. In FIG. 7, the transmitted signal 710 is synchronized in each IMA link individually. Data is demultiplexed 712 and read in IMA transmit buffers 714, 716. A master clock 720 is used to read out of the IMA transmit buffer 714. Loop timing 730 is used for reading the data out of the second IMA transmit buffer 716. If the master clock 720 of the IMA is not synchronzied to the received signal to be used for loop timing 730, slips may occur in a transmitter buffer 714, 716. The only way to avoid the slips is to use stuffing. The loop timing 730 requires always controlling the timing master to avoid timing loops. The timing master can be the other end of the IMA link of the network using re-timing. If the network is used as the timing master, both ends of the IMA link can run in loop-timing mode.

Stuffing mechanism can tolerate the following frequency off-sets:

| cells per IMA frame | frequency off-set/ppm |
| --- | --- |
| 32 | ±3125 |
| 64 | ±1562 |
| 128 | ±781 |
| 256 | ±390 |

The stuffing unit is one ICP cell (53 bytes). The stuffing allows the "plesiocronous" operation where the IMA frame is not synchronized to the ATM-data stream. A normal PDH/SDH transport network always has stuffing functions and the synchronizing of the IMA output signal to the transport network is not necessary. If the IMA links are divided to two different primary rate networks which are not synchronized with each other, stuffing is needed. For the network whose timing is used as master clock, stuffing is not needed but towards to the other network loop timing is the only possibility to avoid slips in IMA transmitter buffer or in the receiver buffers of the 1 st network element. The primary rate network can't adapt the signal with the off-set and the network terminal uses loop timing. The frequency adaptation is made inside transmission protocol of the applications (as IMA stuffing).

Figure 8:
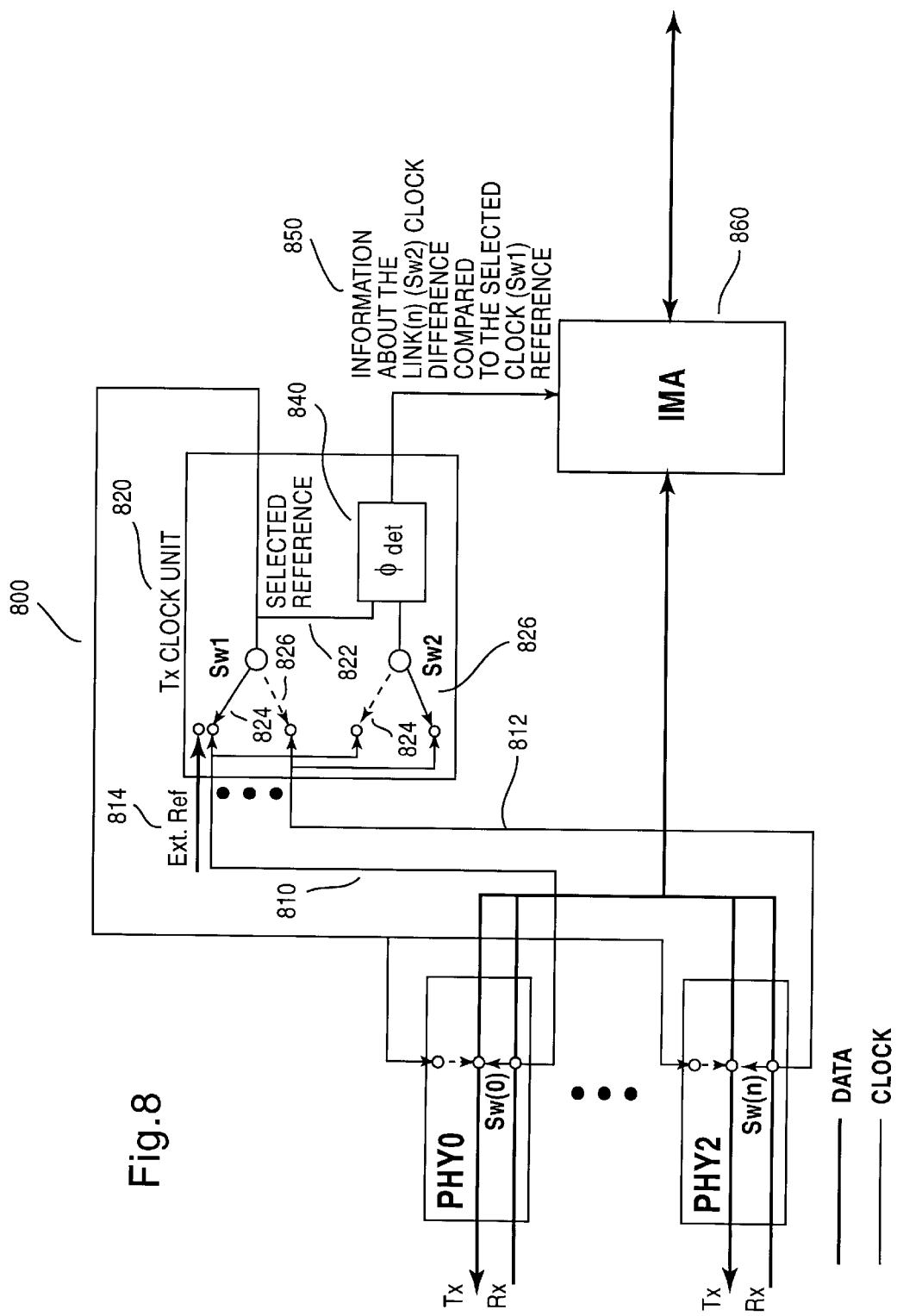
FIG. 8 shows a first embodiment for measuring the difference in frequency between two IMA links.

FIG. 8 shows a first embodiment 800 for measuring the difference in frequency between two IMA links. As shown in FIG. 8, all used IMA links have a capability to differentiate the sender's clock (Rx direction). This clock is used as a write clock in incoming frame buffers. All IMA link Rx clocks 810, 812 are sent to the Tx direction clock unit 820, which is common for all IMA links. One of Rx clocks is selected as a reference 822 for incoming frequency comparison finction (SW1 operation) 824. Alternatively, an external reference 814 may be used. Digital phase detector 840, which is used in Tx clock unit 820, uses this selected reference for phase comparison against other IMA link differentiated clocks (SW 2 operation) 826. After this simple mathematical function is used to calculate frequency difference from phase difference value changes during some time interval:

$$\Delta f = \frac{\Delta \Phi}{2\pi * \Delta t},$$

where $\Delta f$=frequency difference between selected reference (SW 1 operation) and reference under comparison (SW 2 operation), $\Delta \Phi$=phase difference value change, and $\Delta t$=time interval used for phase difference measurement.

The change in phase difference from value C to C+2π, for example, may be measured. The time used for that measurement is checked, i.e., 2π change in phase difference measurement values. The constant, C, is the starting value for the phase difference measurement. However, those skilled in the art will recognize that the rate change may be measured over any timeframe.

When all IMA link frequencies have been calculated using this method, the frequency difference values 850 are delivered to IMA functionality 860 where this information is used for adding the appropriate number of stuffing cells for each particular IMA link compared to the selected IMA link. This information is delivered using any available internal communication link between transmitter clock unit and the IMA functionality.

Figure 9:
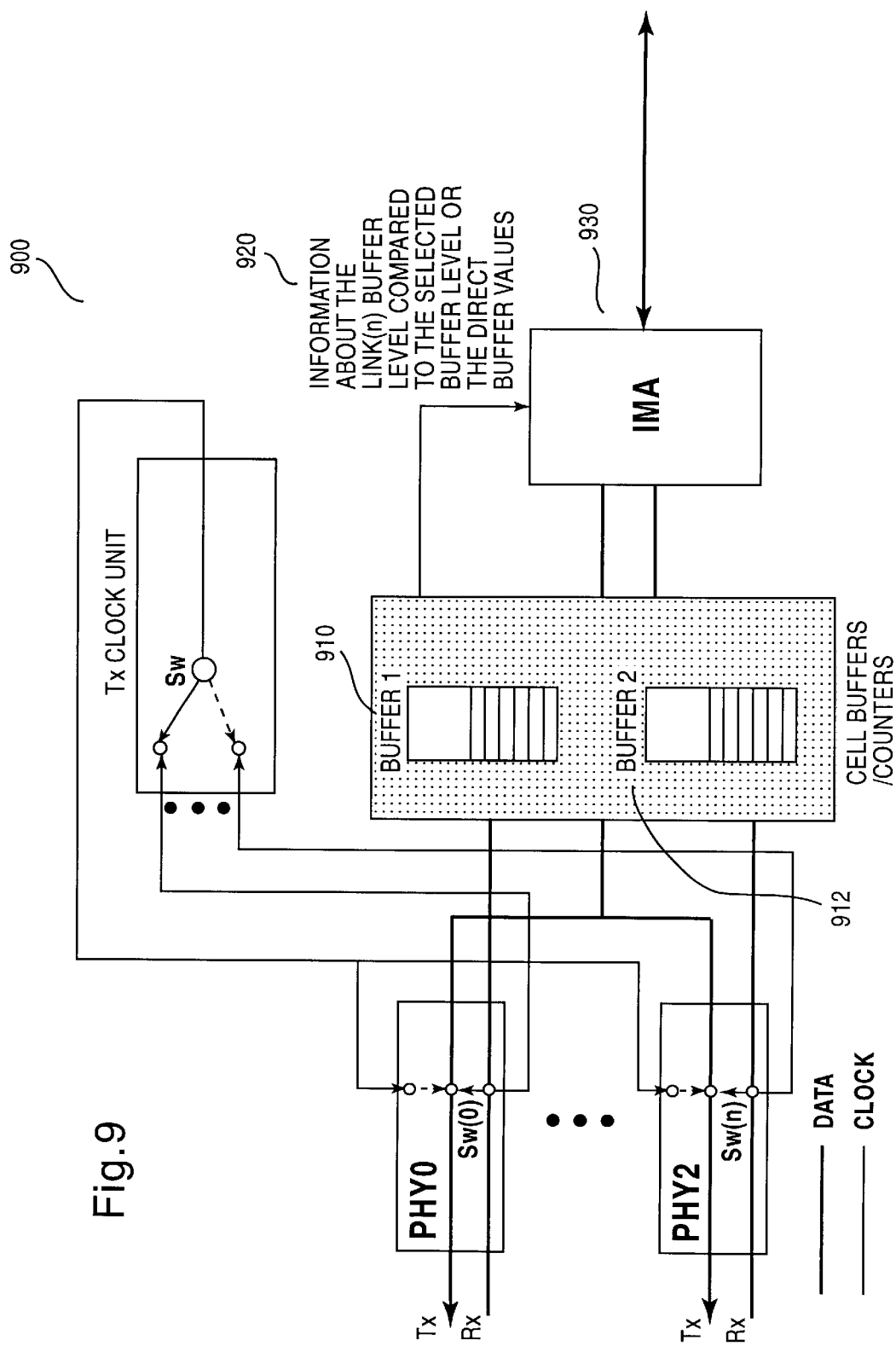
FIG. 9 shows a second embodiment for measuring the difference in frequency between two IMA links.

FIG. 9 shows a second embodiment 900 for measuring the difference in frequency between two IMA links. In FIG. 9, the physical links are in a "ready" state, i.e., there is no user traffic yet, but the frame is full of idle cells. These idle cells are counted or they are put into a buffer 910, 912 that allows its level to be detected. There is one buffer or counter per line.

All counters or buffers 910, 912 are initialized at a same moment, e.g., ti. After a time $\Delta t$ the counter values (n) or buffer levels 910, 912 are checked. The relative difference 920 in cells/s between the timing reference link and the compared link can be expressed through formula:

$$\Delta c = \frac{n_1 - n_2}{\Delta t},$$

where $\Delta c$ represents the frequency difference in cells/s between selected reference and reference under comparison, $n_1$ is the cell amount of the reference link at time $t_2$, $n_2$ is the cell amount of the compared link at time $t_2$ and $\Delta t$ is the time interval used for cell amount difference measurement ($t_2$-$t_1$). From the $\Delta c$, the IMA-function 930 can easily generate the rate at which it must put stuffing cells on the IMA physical links. Actually the $\Delta c$ value gives directly the stuffing rate per time interval.

Figure 10A:
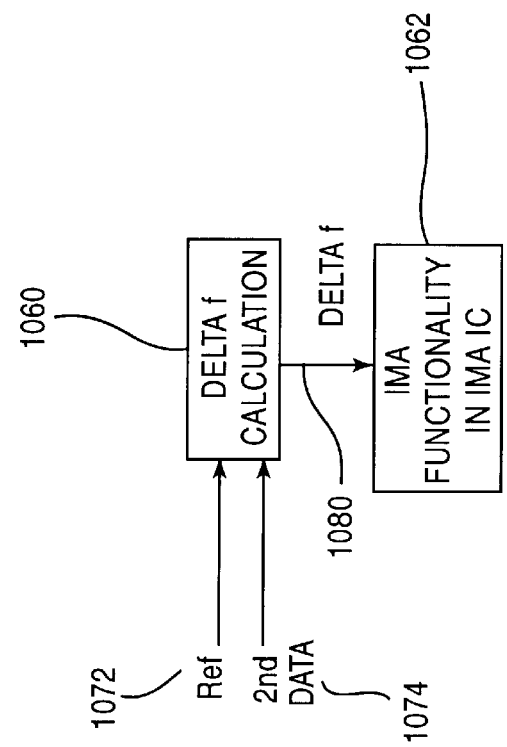
FIGS. 10a–b illustrate two embodiments for performing timing difference compensation according to the present invention.
Figure 10B:
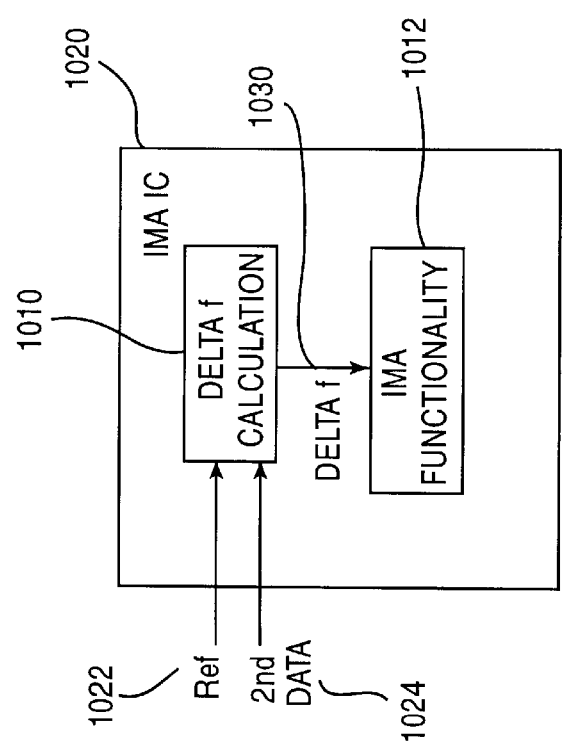

FIGS. 10a—b illustrate two embodiments for performing timing difference compensation according to the present invention. In FIG. 10a, a rate calculator 1010 and IMA function 1012 are formed in an integrated IMA package 1020. The IMA package receives the actual level values 1022, 1024 and calculates the rate difference itself 1030 using the rate calculator 1010, which is then passed on to the IMA function 1012. In FIG. 10b, the rate calculator 1060 is formed as a separate device. The rate calculator 1060 receives the level values 1072, 1074 and calculates the rate difference 1080, which is then passed on to the IMA function 1062. The actual implementation may use, for example, an E1 framer having built-in idle cell counters to measure this difference.

FIG. 11 illustrates a timing system 1100 for an IMA network element. The system can select N inputs 1110 of network clock references using the mode selector 1112. The N inputs 1110 of network clock references are extracted from the network interfaces. One of the N network clock references is chosen as the phase difference measuring reference 1120. Then, a clock 1122 for comparing with the reference can be selected from any of the remaining N-1 network clock references 1130 or alternatively the network node clock 1132. The control logic 1140, which includes a digital phase detector, loop filter and digital-to-analog converter, determines the phase difference between the selected clock signals. This value controls the voltage controlled oscillator 1150 which sets the network node clock frequency 1132. When necessary, the control logic 1150 can also compute the phase difference from the change in phase difference time-wise, and provide it to an IMA-function, i.e., the one which needs it, through the internal bus.

In summary, the present invention provides a method for measuring the timing difference between physical IMA links and for delivering time difference to the IMA layer. The present invention measures the timing difference between physical IMA links and delivers time difference to the IMA layer. The timing differences is then used to generate stuffing cells with the proper rate on the transmit links. The implementation of the physical interfaces with IMA can be a separate IMA chip and separate physical layer framers. When the IMA chip and framers are attach to each other via a UTOPIA bus which doesn't carry the line timing, the IMA chip must receive the frequency difference by some other means.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for determining a number of stuffing cells to be added to an inverse multiplexing ATM link, comprising:
   obtaining a first data value for use as a reference;
   obtaining a second data value;
   processing the first and second data values to obtain an indication of frequency difference; and
   determining a number of stuffing cells to be added to an ATM link based upon the indication of frequency difference,
   wherein the first data value is a counter value of a first buffer containing cells from a first ATM link and the second data value is a counter value of a second buffer containing cells from a second ATM link.

2. The method of claim 1 wherein the first data value comprises a reference clock signal and the second data value is a clock obtained from a first ATM link.

3. The method of claim 2 wherein the processing further comprises examining the reference clock signal and the clock from the first ATM link to obtain the indication of frequency difference.

4. The method of claim 2 wherein the processing further comprises measuring a phase difference between the reference clock and the clock from the first ATM link and calculating the indication of frequency difference in response thereto.

5. The method of claim 4 wherein the calculating further comprises computing a time interval for measuring the phase difference and determining the indication of frequency difference according to:

$$\Delta f = \frac{\Delta \Phi}{2\pi * \Delta t},$$

where $\Delta f$ is the frequency difference between the reference clock and the clock of the first ATM link, $\Delta \Phi$ is the phase difference and $\Delta t$ is the time interval.

6. The method of claim 1 wherein the processing further comprises examining the counter value of the first and second counters to obtain the indication of frequency difference.

7. The method of claim 6 wherein the processing further comprises measuring a cell amount difference based upon the counter value of the first and second counters calculating the indication of frequency difference in response thereto.

8. The method of claim 7 wherein the calculating further comprises computing a time interval for measuring the cell amount difference and determining the indication of frequency difference according to:

$$\Delta c = \frac{n_1 - n_2}{\Delta t},$$

where $\Delta c$ is the frequency difference between the cells in the buffer for the first ATM link and the cells in the buffer for the second ATM link, $n_1$ is the cell amount of the first ATM link, $n_2$ is the cell amount of the second ATM link and $\Delta t$ is the time interval.

9. An apparatus for determining a number of stuffing cells to be added to an inverse multiplexing ATM link, comprising:
   a first device for providing a first data value for use as a reference;
   a second device for providing a second data value;
   a rate calculator for processing the first and second data values to obtain an indication of frequency difference; and
   an IMA function for determining a number of stuffing cells to be added to an ATM link in response to the indication of frequency difference,
   further comprising a first buffer for a first ATM link having a first counter associated therewith and a second buffer for a second ATM link having a second counter associated therewith, wherein the first data value is a counter value for the first buffer containing cells from the first ATM link and the second data value is a counter value for the second buffer containing cells from the second ATM link.

10. The apparatus of claim 9 wherein the first data value comprises a reference clock signal and the second data value is a clock obtained from a first ATM link.

11. The apparatus of claim 10 wherein the rate calculator examines the reference clock signal and the clock from the first ATM link to obtain the indication of frequency difference.

12. The apparatus of claim 11 wherein the rate calculator measures a phase difference between the reference clock and the clock from the first ATM link and calculates the indication of frequency difference in response thereto.

13. The apparatus of claim 12 wherein the rate calculator computes a time interval for measuring the phase difference and determining the indication of frequency difference according to:

$$\Delta f = \frac{\Delta \Phi}{2\pi * \Delta t},$$

where $\Delta f$ is the frequency difference between the reference clock and the clock of the first ATM link, $\Delta \Phi$ is the phase difference and $\Delta t$ is the time interval.

14. The apparatus of claim 9 wherein the IMA function examines the counter value of the first and second counters to obtain the indication of frequency difference.

15. The apparatus of claim 14 wherein the IMA function measures a cell amount difference based upon the counter value of the first and second counters and calculates the indication of frequency difference in response thereto.

16. The apparatus of claim 15 wherein the IMA function computes a time interval for measuring the cell amount difference and determines the indication of frequency difference according to:

$$\Delta c = \frac{n_1 - n_2}{\Delta t},$$

where $\Delta c$ is the frequency difference between the cells in the buffer for the first ATM link and the cells in the buffer for the second ATM link, $n_1$ is the cell amount of the first ATM link, $n_2$ is the cell amount of the second ATM link and $\Delta t$ is the time interval.

17. The apparatus of claim 9 wherein the IMA function and the rate calculator are configured in an integrated packages.

18. The apparatus of claim 9 wherein the IMA function and the rate calculator are separate devices.

* * * * *